United States Patent [19]

McCombs et al.

[11] Patent Number: 5,368,317
[45] Date of Patent: Nov. 29, 1994

[54] FIRE TRUCK TORQUE BOX CHASSIS FRAME

[75] Inventors: William F. McCombs; Jeffrey D. Aiken, both of Ocala, Fla.

[73] Assignee: Emergency One, Inc., Ocala, Fla.

[21] Appl. No.: 5,374

[22] Filed: Jan. 15, 1993

[51] Int. Cl.$^5$ .............................................. A62C 27/00
[52] U.S. Cl. ...................... 280/4; 280/6.12; 280/797; 182/65
[58] Field of Search ............ 280/4, 6.11, 6.12, 6.1, 280/796, 797, 800, 799, 790, 789, 786, 781, 783, 475; 182/2, 64, 65, 67

[56] References Cited

U.S. PATENT DOCUMENTS

| | | | |
|---|---|---|---|
| 527,942 | 10/1894 | Cairnes | 182/67 |
| 581,652 | 4/1897 | Brown | 182/67 |
| 636,984 | 11/1899 | Harris | 182/65 |
| 1,962,497 | 6/1934 | Francis | 280/789 |
| 3,528,678 | 9/1970 | Moulton | 280/781 |
| 4,059,170 | 11/1977 | Young | 280/797 |
| 4,142,710 | 3/1979 | Okuda | 280/6.1 |
| 4,570,973 | 2/1986 | Ewers et al. | 280/800 |

FOREIGN PATENT DOCUMENTS 0298338  4/1954  Germany ........................ 182/67

*Primary Examiner*—Eric D. Culbreth
*Assistant Examiner*—Anne Marie Boehler
*Attorney, Agent, or Firm*—Beaman & Beaman

[57] ABSTRACT

A torque box chassis frame for firefighting vehicles or the like constituting a platform for extendible aerial ladders. The vehicle torque box chassis frame includes elongated lower and upper members significantly spaced from each other having rigid bracing structure interposed therebetween resulting in a rigid elongated box of significant rectangular cross section dimension. The torque box chassis frame rear end is defined by a rigid ladder turntable support including its own vertical rigid columns, and spaced outrigger support tubes for receiving hydraulic outrigger jacks are integrally defined on the torque box chassis frame to provide firm support of the torque box upon the ground eliminating the influence of the vehicle suspension system.

5 Claims, 2 Drawing Sheets

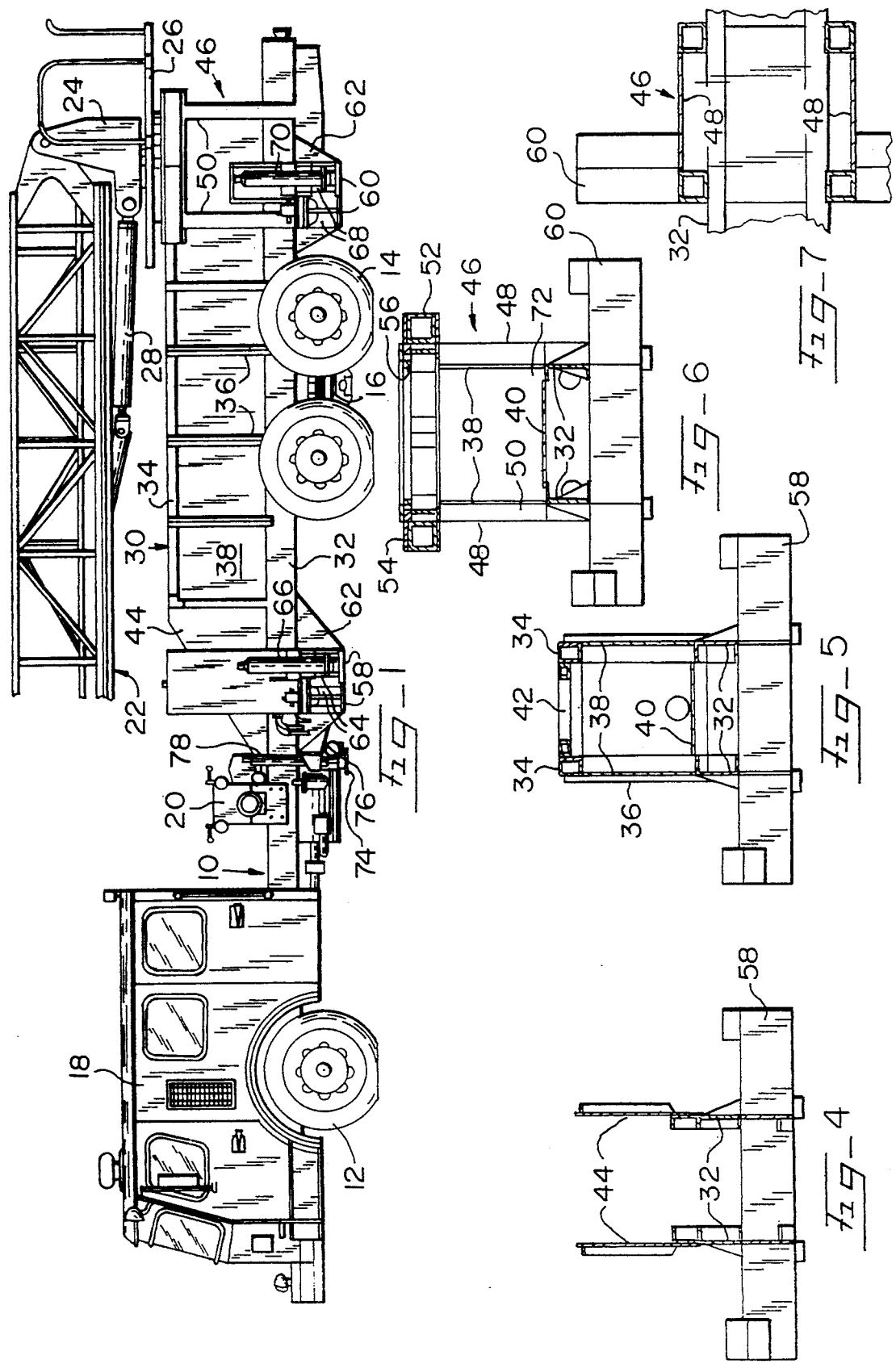

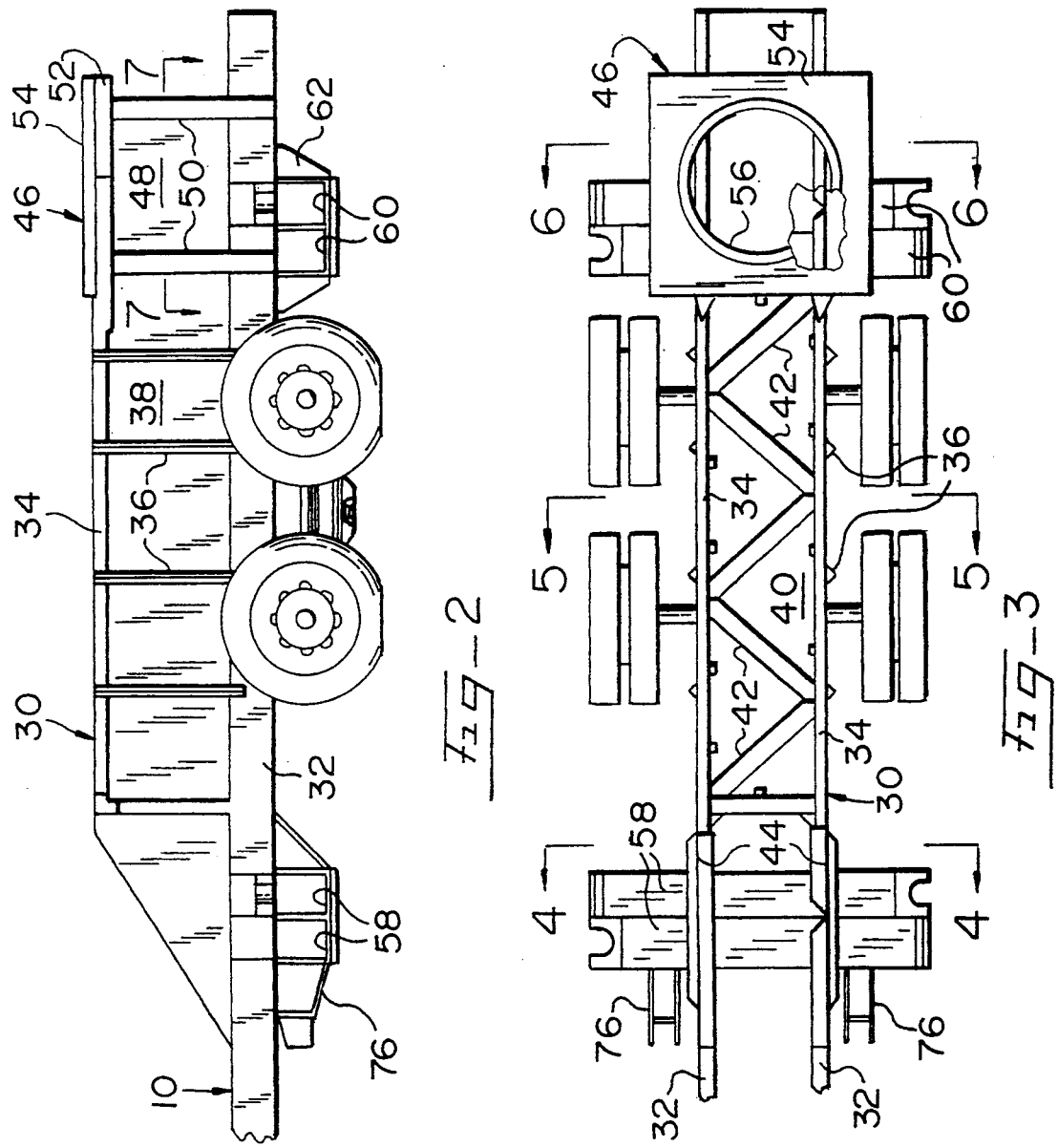

FIRE TRUCK TORQUE BOX CHASSIS FRAME

BACKGROUND OF THE INVENTION

1. Field of the Invention

The invention pertains to vehicle torque box chassis frames for supporting extendible aerial ladders, such a frame being particularly useful with firefighting vehicles.

2. Description of the Related Art

Firefighting vehicles such as ladder trucks include extendible aerial ladders whereby the ladders may be raised and extended in excess of one hundred feet, as may be required in fighting fires in multiple story buildings, or conducting rescues therefrom.

Commonly, extending aerial ladders are hydraulically operated whereby the ladder assembly may be lowered to a stored position, and raised to an operative position. The ladder system consists of a plurality of extension ladders, and when the ladders are extended, and partially raised, significant bending forces are applied to the frame of the support vehicle due to the weight of the ladders, and any personnel or equipment supported thereon.

In order to stabilize vehicles supporting extendible ladder systems, it is common to mount jack systems upon the vehicles which extend laterally from the vehicle sides and include hydraulically extendible jacks for engagement with the ground to stabilize these vehicles during ladder extension. Most jack systems are attached to the conventional vehicle structure, including the suspension system, and while such jack systems do greatly improve the vehicle stability during aerial ladder extension due to the high centroidal moment of inertia imposed upon the vehicle by an extended aerial ladder, the ultimate degree of stability desired has not been achievable, and the height of extendible aerial ladders has been limited due to the inability to provide as stable a ladder platform as possible.

Efforts have been made to improve the stability of aerial ladder platforms as formed on firefighting vehicles, as shown by the assignee's U.S. Pat. No. 4,570,973. In this patent an elongated torque box of generally rectangular transverse cross section utilizes a plurality of braces and webs to form a substantially rigid elongated box upon which the aerial ladder may be supported. However, due to limitations in the vertical dimensions of the torque box shown in U.S. Pat. No. 4,570,973, and structural limitations due to the relationship of the ladder supporting structure to the remainder of the torque box, optimum ladder supporting characteristics were not achieved.

SUMMARY OF THE INVENTION

Objects of the Invention

It is an object of the invention to provide an integral aerial torque box chassis frame which includes a turntable support for aerial ladders wherein the torque box is capable of withstanding high bending forces and provides a stable support platform for extended aerial ladders.

Another object of the invention is to provide an integral aerial torque box vehicle chassis free which includes a turntable support for aerial ladders wherein extendible jack structure is integrally formed with the torque box whereby the torque box may be directly supported upon the ground without influence from the vehicle suspension system.

Yet another object of the invention is to provide an integral aerial torque box vehicle chassis frame constituting a platform for extendible ladders wherein the torque box is supported upon integral jack structure to provide stability, and the torque box is open having an accessible rear end wherein ladders may be stored within the torque box at a readily accessible location and height.

An additional object of the invention is to provide an integral aerial torque box vehicle chassis frame which may be readily fabricated using conventional metal fabricating apparatus.

In the practice of the invention a pair of spaced parallel heavy duty channel members are used to form the lower region of the torque box, while a pair of elongated box cross section members are vertically disposed above the channel members a significant distance to provide sufficient resistance to bending moments. Bracing elements in the form of sheet steel are interposed between the upper and lower box and channel members located on a common side of the box, while the lower channel members are interconnected by a sheet steel bracing floor member. The upper members are preferably interconnected by obliquely disposed truss members who ends are welded to the upper members.

The rear end of the torque box constitutes a turntable support for the aerial ladder apparatus. The turntable support is integral with the other components of the torque box and includes a plurality of columns having a box transverse cross section for supporting the weight of the ladder assembly without deflection. The turntable support defines the rear end of the torque box, and is open in alignment with the length of the torque box chassis frame whereby the interior of the torque box is accessible through the turntable support and may serve as a chamber to receive ladders, or other equipment.

The torque box chassis frame includes jack receiving tubes for supporting hydraulic jacks. The front pair of the jack supporting tubes is located adjacent the front region of the torque box below the channel men,hers, while the rear pair of jack receiving tubes is located below the turntable support. The jack tubes are of a length perpendicularly disposed to the length of the torque box, and the jack structure arms located therein are capable of being laterally extended relative to the torque box length whereby the hydraulic jacks formed on the ends of the extendible arms may be lowered to engage the ground and directly support the torque box chassis upon the terrain.

Due to the rigidity of the torque box chassis frame, the support of the torque box on the terrain by the jacks bypasses the vehicle suspension, and actually raises the vehicle slightly with respect to the terrain whereby, during ladder operation, the entire vehicle may be supported upon the jacks.

A torque box chassis frame constructed in accord with the invention achieves a rigidity not heretofore attained, and provides a platform for an extendible aerial ladder assembly which permits aerial ladders to be extended to heights not previously possible.

BRIEF DESCRIPTION OF THE DRAWINGS

The aforementioned objects and advantages of the invention will be appreciated from the following description and accompanying drawings wherein:

FIG. 1 is a side elevational view of a firefighting vehicle utilizing the torque box chassis frame of the invention, the extendible ladder assembly being partially illustrated, FIG. 2 is a side elevational view of the torque box chassis frame, per se, FIG. 3 is a plan view of the torque box chassis frame of FIG. 2, FIG. 4 is an elevational sectional view as taken along Section 4—4 of FIG. 3, FIG. 5 is an elevational sectional view as taken along Section 5—5 of FIG. 3, FIG. 6 is an elevational sectional view as taken along Section 6—6 of FIG. 3, and FIG. 7 is a plan sectional view as taken along Section 7—7 of FIG. 2.

DESCRIPTION OF THE PREFERRED EMBODIMENT

The overall environment of a fire truck torque body in accord with the invention is best represented in FIG. 1 wherein an entire fire truck vehicle is illustrated. The fire truck basic component is the frame or chassis 10 much of which forms the torque box construction of the invention. The frame is supported on front wheels 12 and dual rear wheels 14 which are attached to the frame 10 by conventional suspension structure 16 which may be formed by leaf springs, torsion springs or air bags, as is well known in the art. The truck cab 18 is located at the front end of the frame 10 and includes the engine and other vehicle control components, as well as providing an enclosure for the firemen during transportation. The usual pump structure 20 may be mounted upon the frame 10, and other apparatus may be mounted upon the truck frame as is commonly used with firefighting equipment.

As the inventive concept pertains to torque boxes used with aerial ladders an extendible ladder 22 is pivotally mounted upon the bracket 24 which is attached to the turntable 26 rotatably supported upon the torque box by conventional bearings, not shown. The vertical elevation of the ladder 22 is controlled by the extendible hydraulic cylinder 28 interposed between the bracket 24 and the ladder structure, as well known. The particular type of extendible ladder utilized with fire trucks employing the invention does not form a part of the invention, and conventional ladder arrangements may be used except that trucks utilizing the torque box of the invention may employ ladders of greater extendible length, and a greater number of sections, than extendible ladder assemblies previously employed with mobile fire truck platforms.

The frame 10 includes a section thereof designated as a torque box 30, the torque box constituting that portion of the vehicle frame upon which the majority of bending forces are imposed when the ladder 22 is extended.

The basic components of the frame 10 are a pair of substantially parallel channel members 32 which extend the length of the vehicle. The members 32 are in spaced relationship to each other and the wheels 12 and 14 are located below the members 32 and support the members through the wheel suspension apparatus.

The torque box 30, in addition to the members 32, is defined by the elongated box members 34 located vertically above the rear portions of the channel members 32 as will be appreciated from FIGS. 1 and 2. Vertical bracing colons 36 are interposed between the members 32 and 34 as being welded thereto, and the lateral sides of the torque box 30 are defined by a sheet metal plate 38 extending between the members 32 and 36 at each side of the torque box and the metal plate 38 is welded to the members 32 and 34, as well as to the columns 36. In this manner the sheet metal plate 38 rigidly interconnects the members 32 and 34 in a vertical direction, and the columns 36 which are also welded to the plate 38 prevent the plate 38 from buckling. A sheet metal bottom plate 40, FIGS. 5 and 6, extends between the upper ends of the channel members 32 wherein the plates 38 and plate 40 define a U-shaped configuration closing in the sides and bottom of the torque box 30.

The upper portion of the torque box is defined by a plurality of truss bracing members 42, FIG. 3, which extends between the box members 34 having shaped ends whereby the men%bets 42 are welded to the box members 34. By the use of the bracing members 42 the torque box 30 is now defined of a rectangular cross sectional configuration having the lateral side bracing plates 38, the bottom plate 40, and the upper truss bracing members 42.

At its front end the torque box 30 is defined by wedge shaped plates 44 extending from the box members 34 to the upper edges of the channel members 32, and the plates 44 are welded to the associated structure to further define an integral assembly.

At its rear end, the torque box 30 is defined by the ladder turn table support 46. The turn table support 46 is defined by lateral sheet plate sides 48 located between four steel box beam columns 50, FIG. 7, welded to the channel members 32 and extending thereabove. The plate sides 48 are also welded to the columns 50, and the columns 50 are also welded to the plates 38. At its upper end, the turn table support 46 includes a rectangular frame 52 formed of steel box beams, and a thick two inch steel plate 54 having the circular opening 56 is welded to the upper turn table frame 52. As the frame 52 is welded to the columns 50 and sides 48, the turn table support 46 constitutes an integral rear end of the torque box 30 so that all forces imposed upon the ladder turn table support 46 will be directly imposed upon the torque box 30. The ladder support structure, not shown in detail, is mounted upon the plate 54 and extends into the opening 56, and such support structure may include bearings, a large gear, motor, and other apparatus for rotating the ladder turn table 26.

When extending the ladder 22 in a vertical direction, it is necessary that the ladder platform be solidly supported upon the ground, and such support is achieved through hydraulic jacks rigidly associated with the frame 10 and torque box 30.

The jacks are mounted within outrigger supports of a rectangular configuration for supporting the jack structure. The outrigger support tubes are best illustrated in FIGS. 2 and 3.

A pair of front or forward jack support tubes 58 are welded to the underside of the channel members 32 at a location directly below the wedge plates 44. The tubes 58 are of an elongated configuration as will be appreciated from FIG. 3, and the length thereof is at right angles to the length of the torque box and channel members 32. The rear jack tubes 60 are also welded to the underside of the channel members 32, and are located directly below the turntable support 46. Bracing fillets 62 may be interposed between the jack tubes and the channel members 32 to prevent twisting or displacement of the jack tubes.

Hydraulic jack arm structure of a known type generally represented at 64 is supported within the front tubes 58, and at their outer ends the jacks include vertically disposed hydraulic cylinders 66 having pistons supporting a foot pad which engages the terrain. The jack arms located within the front tubes 58 extend in an outrigger manner in opposite directions from the torque box 30 to provide lateral support of the front portion of the torque box in either direction.

In a like manner, jack arm structure 68 is located within the rear tubes 60 and include cylinders 70 having foot pads located at the lower end of the cylinder pistons for engaging the terrain, the jack arms 68 being extendible in opposite directions from the torque box 30 in the same manner as the front jacks 64.

Also, a pair of front drop and lock jacks 74 are rigidly mounted on frame 10 by brace gussets 76 which are vertically adjusted by cylinders 78.

In practice, the vertical height of the torque box plates 38 is approximately thirty-six inches, and the separation of the channel members 32 and box members 34 is approximately 36 inches, while the separation of the channel members 32 is of substantially equal dimension, and as the plates 38, the bottom 40, and the truss bracing members 42, as well as the turn table support sides 48, columns 50 and frame 52 all define a large hollow box beam, the torque box 30 is capable of withstanding very high bending forces with minimal deformation as imposed thereon by the weight of the ladder assembly 22. As the jacks 64, 68 and 74 are directly connected to the torque box 30 the support of the torque box and ladder assembly is directly by the terrain, and the vehicle suspension is bypassed and is not a part of the ladder support. Accordingly, the torque box 30 is directly supported upon the terrain and as the jacks 64 and 68 can be longitudinally laterally extended within their tubes 58 and 60, respectively, a wide, rigid, broad base support for the torque box 30 is provided.

On uneven terrain, the extension of the cylinders 66, 70 and 78 may actually lift the rear wheels 14, and/or front wheels 12, from the terrain, depending upon the degree of the grade. However, upon the jack cylinders being raised, and retracted into their associated tubes, the weight of the vehicle frame 10 will be supported by the wheels and their associated suspensions.

As will be appreciated from FIGS. 5 and 6, the configuration of the torque box 30 is such that a rectangular space 72, FIG. 6, is located between the plates 38 and above the bottom plate 40, and this space is open at the rear through the turn table support 46 whereby ladders, hose, or other equipment may be readily stored within the space 72 of the torque box 30, and easily and rapidly removed therefrom for use.

The rigidity and stability of the torque box 30 utilizing the aforedescribed concepts per, nits a heavier and longer ladder assembly 22 to be mounted upon a vehicle than heretofore possible, and the practice of the invention provides increased firefighting and rescue capabilities.

It is appreciated that various modifications to the inventive concepts may be apparent to those skilled in the art without departing from the spirit and scope of the invention.

We claim:

1. A fire truck torque box for supporting an extendible ladder comprising, in combination, an elongated box having a pair of elongated spaced lower members, a pair of elongated spaced upper members spaced directly above said lower members wherein said members together transversely define a rectangular box having a front end, a rear end, vertical lateral sides, a bottom, and a top, said lower members each extending the length of said box and located adjacent said bottom and one of said lateral sides, said upper members each being located adjacent said top and one of said lateral sides, said box defining a rigid structure, a first pair of elongated outrigger support tubes rigidly affixed to said lower members adjacent said box front end and below said box bottom, a second pair of elongated outrigger support tubes rigidly affixed to said lower members adjacent said box rear end and below said box bottom, the length of said pairs of outrigger support tubes being substantially perpendicular to the length of said box and the length of said lower members, said box lateral sides being formed of rigid first bracing comprising steel plates extending between said lower and upper members located on a common box lateral side and welded thereto and enclosing the associated side, said box bottom being formed by rigid second bracing comprising a steel plate extending between said lower members and welded thereto, said box top being formed by rigid third bracing extending between said upper members, an extendible hydraulic outrigger jack located within each of said outrigger support tubes said box rear end being integrally defined by a ladder support turntable including vertical columns rigidly affixed to and extending upwardly from said lower members and affixed to said lateral side plates and an upper plate rigidly affixed to said upper members and said columns defining a ladder support ring.

2. In a fire truck torque box as in claim 1, said third rigid bracing comprising elongated steel truss members each having ends, the length of said truss members being obliquely related to the length of said box and the ends of said truss members being welded to said upper members.

3. In a fire truck torque box as in claim 1, said lower members comprising channels, and said upper members comprising rectangular tubes.

4. In a fire truck torque box as in claim 1, said rigid box rear end as defined by said ladder support turntable being open whereby the interior of said box defines a ladder storage chamber accessible through said open box rear end.

5. A fire truck torque box for supporting an extendible ladder comprising, in combination, an elongated box having a pair of elongated spaced lower members, a pair of elongated spaced upper members spaced directly above said lower members wherein said members together transversely define a rectangular box having a front end, a rear end, lateral sides, a bottom, and a top, said lower members each extending the length of said box and located adjacent said bottom and one of said lateral sides, said upper members each being located adjacent said top and one of said lateral sides, said box defining a rigid structure, a first pair of elongated outrigger support tubes rigidly affixed to said lower members adjacent said box front end and below said box bottom, a second pair of elongated outrigger support tubes rigidly affixed to said lower members adjacent said box rear end and below said box bottom, the length of said pairs of outrigger support tubes being substantially perpendicular to the length of said box and the length of said lower members, said box lateral sides being formed of rigid first bracing comprising steel plates extending between said lower and upper members located on a common box lateral side and welded thereto, said box bottom being formed by rigid second bracing comprising a steel plate extending between said lower members and welded thereto, said box top being formed by rigid third bracing extending between said upper members, an extendible hydraulic outrigger jack located within each of said outrigger support tubes and a ladder support turntable integrally and rigidly affixed to said box at said rear end between said box bottom and top whereby said turntable comprises an integral part of said box, the distance between said upper members and between said lower members being approximately 36 inches and the distance between said lower members and the upper member directly thereabove being approximately 36 inches whereby the transverse configuration of said box is substantially equate.

* * * * *